US010796711B2

(12) United States Patent
Jiang et al.

(10) Patent No.: US 10,796,711 B2
(45) Date of Patent: Oct. 6, 2020

(54) SYSTEM AND METHOD FOR DYNAMIC OPTICAL MICROPHONE

(71) Applicant: HONDA MOTOR CO., LTD., Minato-ku, Tokyo (JP)

(72) Inventors: James Jiang, Torrance, CA (US); Rahul Khanna, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 15/720,562

(22) Filed: Sep. 29, 2017

(65) Prior Publication Data
US 2019/0103125 A1    Apr. 4, 2019

(51) Int. Cl.
*G10L 15/00* (2013.01)
*G10L 15/04* (2013.01)
(Continued)

(52) U.S. Cl.
CPC ........ *G10L 21/0272* (2013.01); *G10K 11/178* (2013.01); *H04M 3/40* (2013.01);
(Continued)

(58) Field of Classification Search
CPC . G06F 3/0346; H04R 23/008; H04R 2420/07; H04R 3/005; H04R 5/02;
(Continued)

(56) References Cited

U.S. PATENT DOCUMENTS 5,719,675 A * 2/1998 Killpatrick ........... G01C 19/661
356/459
6,041,020 A * 3/2000 Caron .................... G01H 9/008
356/340
(Continued)

FOREIGN PATENT DOCUMENTS

WO    WO 2016/081118 A1    5/2016
WO    WO 2017/017569 A1    2/2017
WO    WO 2017/017593 A1    2/2017

OTHER PUBLICATIONS

Ding I.J., Shi J.Y. Kinect microphone array-based speech and speaker recognition for the exhibition control of humanoid robots Comput. Electr. Eng. (2016), 10.1016/j.compeleceng.2015.12.010 (Year: 2016).*
(Continued)

*Primary Examiner* — Michael Ortiz-Sanchez
(74) *Attorney, Agent, or Firm* — Arent Fox LLP

(57) ABSTRACT

A dynamic optical microphone system may include an acoustic microphone that receives an audio signal and a laser microphone that transmits a laser beam and receives optical feedback from a human struck by the laser beam. The system may include a depth sensor that determines a distance to the human and a camera that tracks human faces. A processor may be communicatively coupled to the acoustic microphone, laser microphone, depth sensor, camera, and a memory storing computer executable instructions. The processor may determine a direction to a human, direct the laser beam at a voice box of the human, determine a distance to the human using the depth sensor, adjust an intensity of the laser beam based on the distance, receive optical feedback and isolate a voice signal through the optical feedback from background noise in the audio signal.

20 Claims, 4 Drawing Sheets

(51) Int. Cl.
*G10L 21/0272* (2013.01)
*H04R 23/00* (2006.01)
*H04M 3/40* (2006.01)
*G10K 11/178* (2006.01)
*H04N 13/25* (2018.01)
*H04N 13/243* (2018.01)

(52) U.S. Cl.
CPC ........... *H04N 13/25* (2018.05); *H04R 23/008* (2013.01); *H04N 13/243* (2018.05); *H04R 2420/07* (2013.01)

(58) Field of Classification Search
CPC ...... H04R 1/1083; H04R 1/326; H04R 23/02; H04R 2430/20; H04R 2499/11; H04R 3/04; H04R 1/406; H04R 2410/03; H04R 3/00; G10L 21/0272; G10L 2021/02165; G10L 21/0208; G10L 25/93; H04M 3/40; H04L 67/12; G01H 9/00; H01S 5/0683; G01J 3/0237; G01J 3/0278; G10K 11/178
See application file for complete search history.

(56) References Cited

U.S. PATENT DOCUMENTS

| | | | |
|---|---|---|---|
| 6,317,237 | B1 | 11/2001 | Nakao et al. |
| 9,558,563 | B1 | 1/2017 | Kamarshi et al. |
| 9,661,424 | B1 | 5/2017 | Bakish |
| 9,661,470 | B1* | 5/2017 | Du Bois ............... H04W 4/027 |
| 2007/0297620 | A1 | 12/2007 | Choy |
| 2008/0292146 | A1* | 11/2008 | Breed ................... B60N 2/002 |
| | | | 382/118 |
| 2009/0070358 | A1* | 3/2009 | Tokura ................... H04L 67/12 |
| 2010/0034397 | A1* | 2/2010 | Nakadai ................ B25J 5/00 |
| | | | 381/58 |
| 2010/0329479 | A1* | 12/2010 | Nakadai ................ B25J 9/00 |
| | | | 381/92 |
| 2011/0224979 | A1* | 9/2011 | Raux ...................... G10L 15/07 |
| | | | 704/233 |
| 2012/0257020 | A1 | 10/2012 | Yee et al. |
| 2014/0028996 | A1* | 1/2014 | Liu ......................... G01N 21/65 |
| | | | 356/51 |
| 2014/0097957 | A1* | 4/2014 | Breed ................ G08B 21/0407 |
| | | | 340/576 |
| 2014/0119737 | A1 | 5/2014 | Bakish |
| 2015/0012269 | A1* | 1/2015 | Nakadai .............. G10L 21/0208 |
| | | | 704/233 |
| 2016/0104019 | A1 | 4/2016 | Todeschini et al. |
| 2016/0111091 | A1 | 4/2016 | Bakish |
| 2016/0267911 | A1 | 9/2016 | Koetje |
| 2016/0302010 | A1 | 10/2016 | Sebastian et al. |
| 2016/0375592 | A1* | 12/2016 | Szatmary .................. B25J 5/00 |
| | | | 700/255 |
| 2017/0150254 | A1* | 5/2017 | Bakish .................... G10L 25/93 |
| 2017/0364091 | A1* | 12/2017 | Bennett .................. G06F 21/602 |
| 2019/0054876 | A1* | 2/2019 | Ferguson ............ G06K 9/00201 |
| 2019/0090068 | A1* | 3/2019 | Fishman ................. H01S 5/187 |

OTHER PUBLICATIONS

Sebastian Lang, Marcus Kleinehagenbrock, Sascha Hohenner, Jannik Fritsch, Gernot A. Fink, and Gerhard Sagerer. 2003. Providing the basis for human-robot-interaction: a multi-modal attention system for a mobile robot. In Proceedings of the 5th international conference on Multimodal interfaces. (Year: 2003).*

* cited by examiner

SYSTEM AND METHOD FOR DYNAMIC OPTICAL MICROPHONE

BACKGROUND

Conventionally, audio or acoustic microphones may be used to receive a desired audio signal (e.g., a voice of a human speaker). A drawback of the audio microphones may be that they typically also capture background noise, interferences, ambient noises, environmental noises, and/or audio from other non-desired sources of human speech. In the area of computerized speech recognition, such other audio sources may increase the difficulty of parsing words (e.g., voice commands) from the desired audio signal.

Optical microphones have been proposed that may transmit a laser beam towards a human speaker, receive an optical feedback signal reflected back from the human speaker, and perform self-mixing interferometry to improve the quality of an audio signal. Such optical microphones may be typically used in a situation where there is a relatively constant spatial relationship between the human speaker and the optical microphone. The human speaker may be requested or required to stand at a particular spot or location in order to enable the system to efficiently work.

In view of the foregoing, there is a need for a dynamic optical microphone that operates when there is relative movement between the optical microphone and the subject. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a system for receiving a voice signal includes an acoustic microphone that receives an audio signal. The system includes a laser microphone that transmits a laser beam and receives optical feedback from a human struck by the laser beam. The system includes a depth sensor that determines a distance to the human. The system includes a camera that tracks human faces. The system includes a processor communicatively coupled to the acoustic microphone, laser microphone, depth sensor, camera, and a memory storing computer executable instructions. The processor determines a direction to the human. The processor directs the laser beam at a voice box of the human. The processor determines a distance to the human using the depth sensor. The processor adjusts an intensity of the laser beam based on the distance. The processor receives optical feedback from the laser beam striking the human. The processor isolates a voice signal through the optical feedback from the laser microphone from background noise in an audio signal received by the acoustic microphone.

According to one aspect of the present disclosure, a method of receiving a voice signal, includes determining a direction to a human. The method includes directing a laser beam at a voice box of the human. The method includes determining a distance to the human using a depth sensor. The method includes adjusting an intensity of the laser based on the distance. The method includes receiving optical feedback from the laser beam striking the human speaker. The method includes isolating a voice signal through the optical feedback from the laser microphone from background noise in the audio signal.

According to another aspect of the present disclosure, a robot for receiving a voice signal includes an acoustic microphone; a laser microphone; a depth sensor; a camera; and a processor communicatively coupled to the acoustic microphone, laser microphone, depth sensor, camera, and a memory storing computer executable instructions. The processor may determine a direction to a human speaker. The processor may direct the laser beam at a voice box of the human speaker. The processor may determine a distance to the human speaker using the depth sensor. The processor may adjust an intensity of the laser beam based on the distance. The processor may receive optical feedback from the laser beam striking the human speaker. The processor may isolate a voice signal through the optical feedback from the laser microphone from background noise in an audio signal received by the acoustic microphone.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory.

Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

Generally described, the present disclosure provides for systems and methods for a dynamic optical microphone that adapts to changes in the spatial positioning between the microphone and a human speaker. In an aspect, the dynamic optical microphone may be positioned on a robot that interacts with the human speaker. For example, the robot may receive voice queries or commands from the human speaker using the optical microphone. The optical microphone may aim a laser at a voice box of the human speaker and may adjust various parameters of the laser based on the relative position of the human and the optical microphone.

Figure 1:
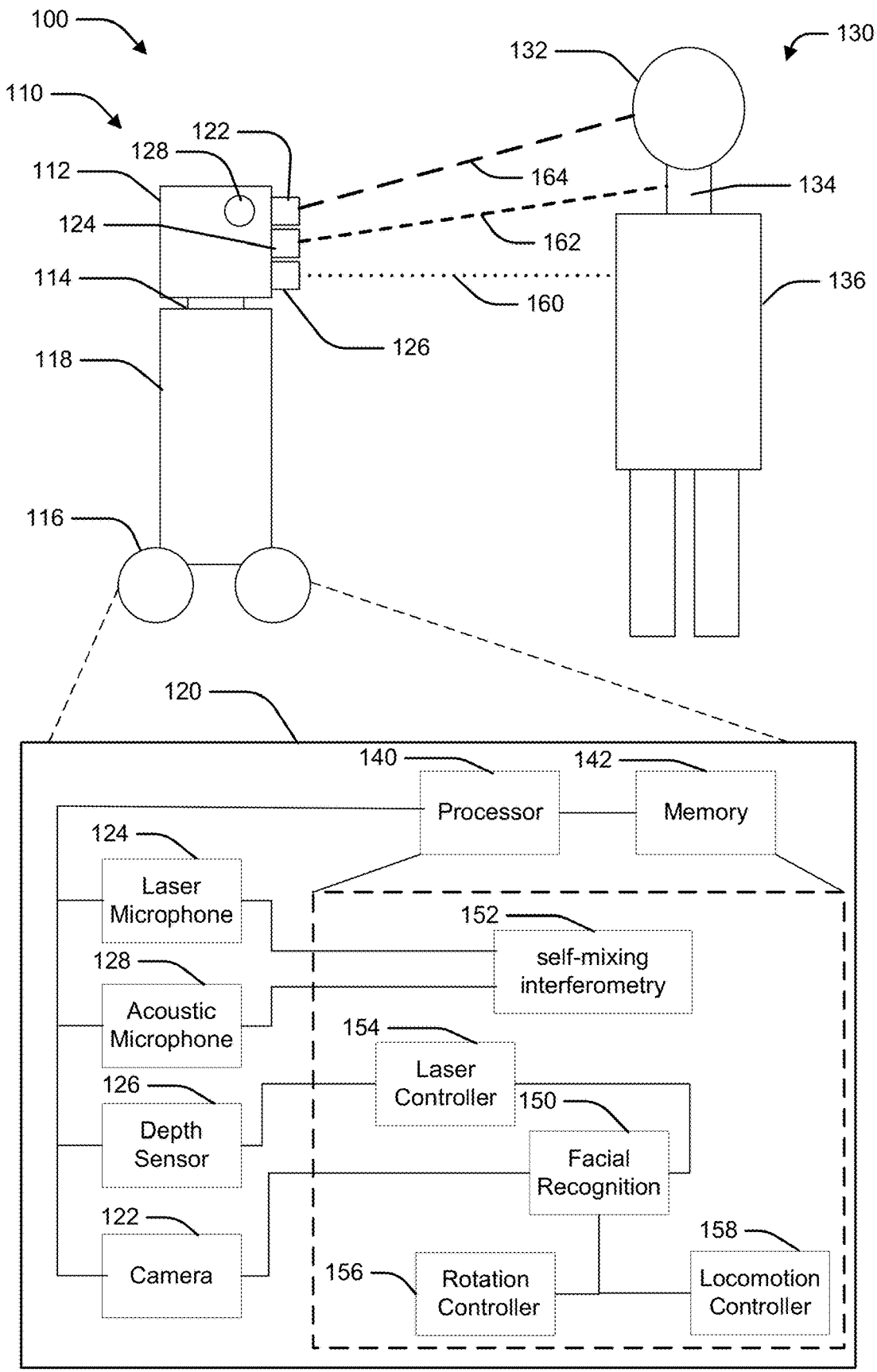
FIG. 1 illustrates a schematic view of an example operating environment of a dynamic optical microphone in accordance with aspects of the present disclosure.

Turning to FIG. 1, a schematic view of an example operating environment 100 of an optical microphone system 120 and example methods according to an aspect of the disclosure are provided. The optical microphone system 120 may reside within a robot 110. The robot 110 may be a system capable of some degree of autonomous movement with respect to a human speaker 130. As illustrated, the robot 110 includes a sensor system 112 pivotably mounted on a body 118 via a rotational system 114. The rotational system 114 may include an electric motor and drive gears to rotate the sensor system 112. The rotational system 114 may be controlled by a rotation controller 146. The robot 110 may include a drive system 116 for autonomously moving the robot 110. The drive system 116 may include one or more of wheels, legs, propellers, or treads and one or more actuators, motors, engines, or other power source to move the robot 110. The drive system 116 may be controlled by a locomotion controller 158.

Although the optical microphone system 120 is illustrated as being mounted on a robot 110, it should be appreciated that, in an aspect, the optical microphone system 120 may be stationary and be capable of rotational movement (e.g., yaw, pitch, and roll). For example, the optical microphone system 120 may be mounted on a kiosk, table, wall, or other stationary object and be used to dynamically receive an audio signal from a moving human speaker 130. Further, in an aspect, the optical microphone system 120 may be manually positionable, for example, as a hand-held device or wearable equipment.

The optical microphone system 120 may include a camera 122 for facial tracking of the human speaker 130, a laser microphone 124 for projecting a laser beam at the human speaker 130 and receiving optical feedback, a depth sensor 126 for determining a distance to the human speaker 130, and an acoustic microphone 128 for receiving an audio signal from the human speaker 130. The optical microphone system 120 may include a processor 140 and a memory 142 configured to process signals received from the sensor system 112 and control the robot 110. The memory 142 may store computer-executable instructions for execution by the processor 140. The processor 140 and memory 142 may implement various software components such as a facial recognition system 150, self-mixing interferometry component 152, a laser controller 154, a rotation controller 156, and a locomotion controller 158. It should be appreciated that any of the software modules may be implemented as a separate hardware device such as an Electronic Control Unit (ECU).

The human speaker 130 may be a human that interacts with the robot 110. From the perspective of the optical microphone system 120, the human speaker 130 may be considered to include a face 132, voice box 134, and body 136. As discussed in further detail below, the facial recognition system 150 may recognize and track human facial features. Although human facial features may vary significantly, the facial recognition system 150 may identify distinct features of most human faces and track the distinct features over a series of images to determine movement of the human speaker 130. The voice box 134 is located in the neck of the human speaker 130 and generates vibrations causing the desired audio signal. The optical microphone system 120 may aim the laser microphone 124 at the voice box 134 based on the position of the face 132. The laser microphone 124 may detect an optical feedback signal from surface vibrations on the neck of the human speaker 130. The voice box 134 may remain relatively fixed in relation to the position of the face 132. Accordingly, the optical microphone system 120 may track the position of the face 132 and aim the laser microphone 124 at the voice box 134. The depth sensor 126 may measure a distance to the human speaker 130. Generally, the depth sensor 126 may detect a closest feature of the human speaker 130, which may be the body 136. For example, the depth sensor 126 may measure the distance along a horizontal line.

The camera 122 may be a digital camera capable of capturing one or more images or image streams, or may be another image capturing device, such as a scanner. The camera 122 may be mounted to the robot 110 in the sensor system 112 and may be rotated by the rotational system 114. In an aspect, the camera 122 may include a positioning system for adjusting the pitch of the camera 122, but the pitch may be fixed. The camera 122 may provide images to the facial recognition system 150.

The facial recognition system 150 may locate and track human faces within one or more images from the camera 122. An example of facial recognition system 150 may be Intel® RealSense™. The facial recognition system 150 may output a location of the face (e.g., x, y, z, coordinates), an orientation (e.g., yaw, pitch, roll), and a movement vector (e.g., movement between sequential images). The output of the facial recognition system 150 may be provided to the rotation controller 156 and/or the locomotion controller 158, which may move or rotate the robot 110 to track the human speaker 130. The output may also be provided to the laser controller 154 for aiming the laser microphone 124 at the voice box 134 of the human speaker 130.

The laser microphone 124 may transmit an optical beam (e.g., a laser beam) towards the human speaker 130 (e.g., voice box 134), and capture and analyze the optical feedback that is reflected from the human speaker 130, particularly from vibrating regions or vibrating face-regions or face-portions of the human speaker. In an aspect, the laser microphone 124 may be affected by the distance to the human speaker 130. In particular, changing distances may affect a strength of the optical feedback. In order to maintain a more stable optical feedback, an intensity of the laser beam transmitted by the laser microphone 124 may be adjusted based on the distance. For example, the intensity may be directly proportional to the distance.

The depth sensor 126 may measure a distance between the optical microphone system 120 and the human speaker 130. In an aspect, the depth sensor 126 may be integrated with the camera 122 and may determine the distance based on one or more camera images. For example, the depth sensor 126 may use stereo triangulation with multiple cameras to determine the distance. The depth sensor 126 may also use time of flight or interferometry to measure a distance to the human speaker 130. In an aspect, the depth sensor 126 may more reliably measure a distance to the body 136 of the human speaker 130 than to the face 132 or voice box 134 due to changing facial characteristics. The depth sensor 126 may measure a distance along a horizontal path 160 to the body 136 and estimate a distance along the laser path 162 to the voice box 134 based on an angle between the horizontal path 160 and the laser path 162 of the laser microphone 124. The estimate may also include an offset based on an average distance between the body 136 and the voice box 134 (e.g., about 5 cm). Similarly, an estimate may also be derived based on a measured distance to the face 132 along the camera path 164.

The acoustic microphone 128 (which may interchangeably be referred to as an audio microphone) may capture an audio signal. In an aspect, one or more acoustic microphones 128 may be located on the sensor system 112. In an aspect, the acoustic microphone 128 may directional and may be aimed at the human speaker 130 along with the laser microphone 124.

The results of the optical feedback from the laser microphone 124 and the signal from the acoustic microphone 128 may be provided to a self-mixing interferometry component 152. The optical feedback from the laser microphone 124 may be utilized in order to improve, enhance, or filter the captured audio signal and/or to reduce or cancel noise(s) from the captured audio signal. The optical microphone system 120 may be implemented as a hybrid acoustic-and-optical sensor, or as a hybrid acoustic-and-optical sensor. The self-mixing interferometry component 152 may be or may comprise or may utilize a Self-Mix (SM) chamber or unit, an interferometry chamber or unit, an interferometer, a vibrometer, a targeted vibrometer, or other suitable component, able to analyze the spectrum of the received optical signal with reference to the transmitted optical beam, and able to remotely estimate the audio or speech or utterances generated by the human speaker 130.

Figure 2:
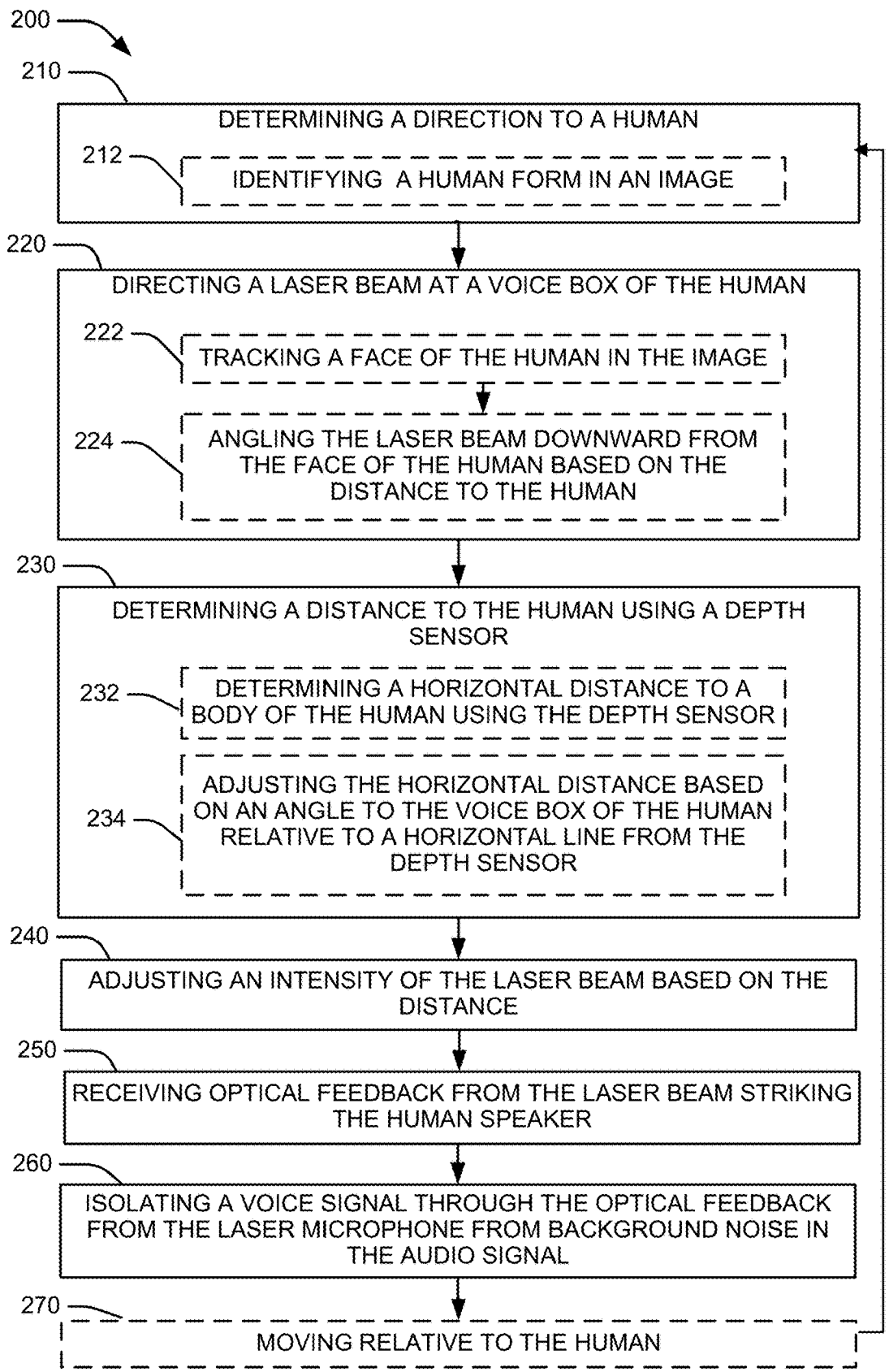
FIG. 2 illustrates a flowchart showing an exemplary method for using a dynamic optical microphone in accordance with aspects of the present disclosure.

FIG. 2 illustrates a flowchart showing an exemplary method 200 for operating a dynamic optical microphone. The method 200 may be performed by the optical microphone system 120.

In block 210, the method 200 may include determining a direction to a human. In an aspect, for example, optical microphone system 120 may determine a direction to the human speaker. For example, the optical microphone system 120 may use the camera 122 and/or the acoustic microphone 128 to determine a direction to the human speaker 130. In an aspect, in block 212, block 210 may include identifying a human form in an image. For instance, the facial recognition system 150 may identify a human form in an image from the camera 122.

In block 220, the method 200 may include directing a laser beam at a voice box of the human. In an aspect, for example, optical microphone system 120 may direct a laser beam from the laser microphone 124 at the voice box 134 of the human speaker 130. In an aspect, in block 222, block 220 may include tracking a face of the human in the image. For example, the facial recognition system 150 may track the face 133 of the human speaker 130 in the image from the camera 122. For example, the facial recognition system 150 may identify a feature in sequential images from the camera 122 and determine movement between images. In block 224, block 220 may include angling the laser beam downward from the face of the human based on the distance to the human. For example, the laser controller 154 may angle the laser beam downward from the face 132 of the human speaker 130 based on the distance to the human in order to direct the laser beam at the voice box 134. The rotation controller 156 may determine whether the sensor system 112 should be rotated to direct the laser beam at the voice box 134. For example, the rotation controller 156 may determine whether the recognized face 132 is in a central region of the camera images. The rotation controller 156 may control the rotational system 114 to rotate the sensor system 112 to bring the face 132 toward the center of the camera image.

In block 230, the method 200 may include determining a distance to the human using a depth sensor. In an aspect, for example, the optical microphone system 120 may determine the distance to the human speaker 130 using the depth sensor 126. In some cases, the depth sensor 126 may detect a distance to the face 132 or the body 136, but a desired distance may be a distance to the voice box 134. For example, in block 232, block 230 may include determining a horizontal distance to a body of the human using the depth sensor. For example, the optical microphone system 120 may determine a horizontal distance to the body 136 of the human speaker 130. In block 234, block 230 may include adjusting the horizontal distance based on an angle to the voice box of the human relative to a horizontal line from the depth sensor. For example, the optical microphone system 120 may determine an angle between the horizontal path 160 and the laser path 162, then adjust the distance measurement of the horizontal path 160 based on the angle. The optical microphone system 120 may also add an offset to compensate for the relative position of the body 136 and voice box 134.

In block 240, the method 200 may include adjusting an intensity of the laser beam based on the distance. In an aspect, for example, the laser controller 154 may adjust the intensity of the beam emitted by the laser microphone 124 based on the distance between the laser microphone 124 and the voice box 134 of the human speaker 130.

In block 250, the method 200 may include receiving optical feedback from the laser beam striking the human speaker. In an aspect, for example, the laser microphone 124 may receive optical feedback from the laser beam striking the human speaker 130.

In block 260, the method 200 may include isolating a voice signal through the optical feedback from the laser microphone from background noise in the audio signal. In an aspect, for example, the self-mixing interferometry component 152 may isolate the voice signal through the optical feedback from the laser microphone 124 from background noise in the audio signal. The voice of the human speaker 130 may be, for example, a voice command from the human speaker 130 to control the robot 110. The processor 140 may interpret the voice command from the voice signal. The processor 140 may also control the robot 110 based on the voice command to perform a task. For example, the processor 140 may use the locomotion controller 158 to control the robot 110 to go to a location named by the human speaker 130 or to follow the human speaker 130. As another example, the robot 110 may include a speaker and respond to the human speaker 130, for example, by answering a question in the voice signal. The robot 110 may be configured to perform other tasks, each of which may be associated with voice commands.

In block 270, the method 200 may optionally include moving relative to the human. In an aspect, for example, the optical microphone system 120 may move relative to the human speaker 130. The movement may be due to movement of either the human speaker 130, the robot 110, or both. The movement may include one or both of positional movement and angular movement. For example, the robot 110 may move relative to the human speaker 130 to perform various actions such as following or leading the human speaker, collecting an object, or performing another task for the human speaker 130. The movement between the human speaker 130 and the optical microphone system 120 may decrease performance of the optical microphone system 120. For example, the laser beam may no longer be targeting the voice box 134, or the intensity may not be correct for the current distance. The method 200 may return to block 210 to operate the optical microphone system 120. Accordingly, operation of the optical microphone system 120 may continue in a looping or cyclical manner to dynamically track the voice box 134 of the user and use the optical signal to improve the received audio signal.

Figure 3:
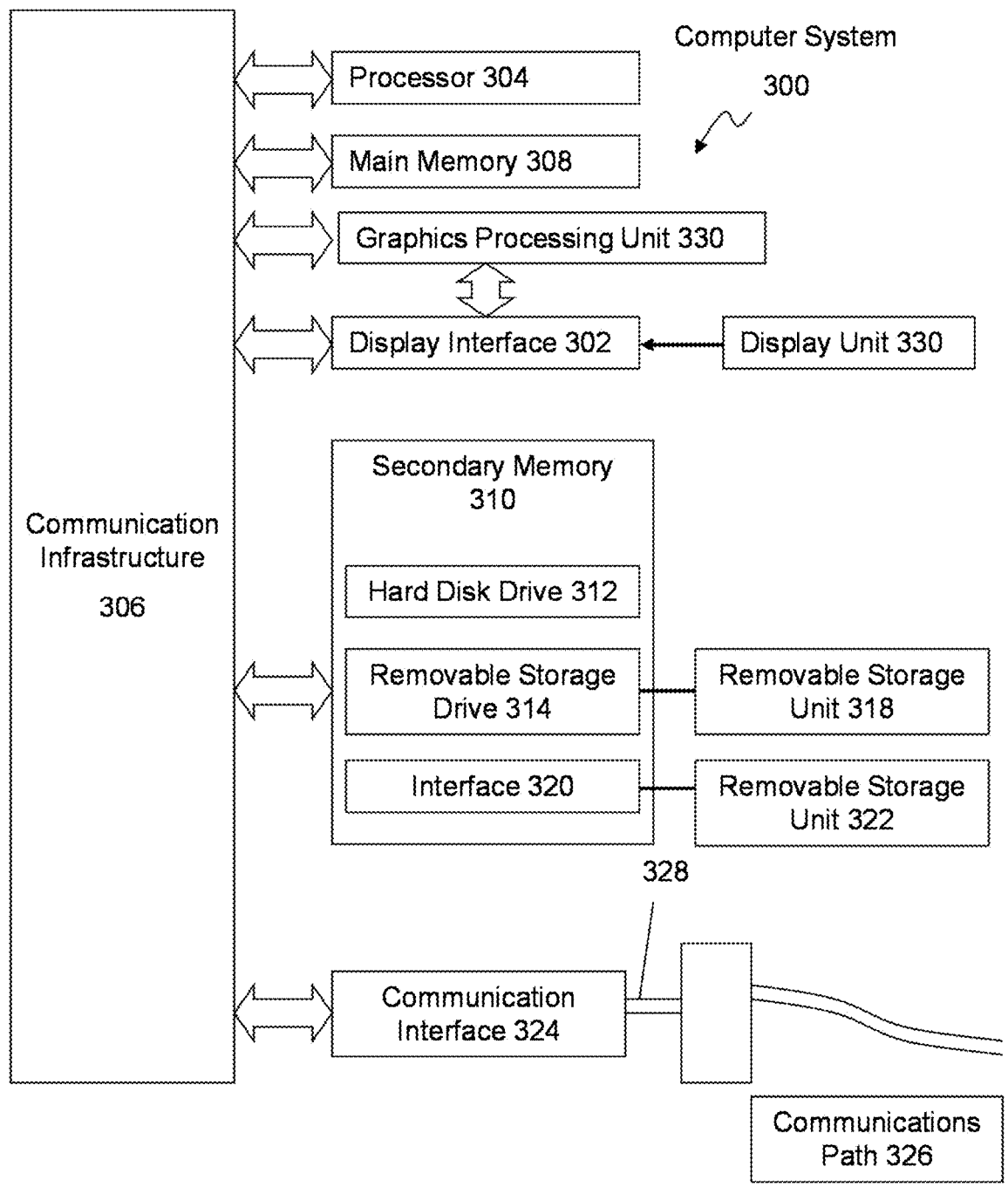
FIG. 3 presents an exemplary system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 3 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc., which is read by and written to removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the faun of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 380, a hard disk installed in hard disk drive 370, and signals 328. These computer program products provide software to the computer system 300. Aspects of the disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform various features in accordance with aspects of the present disclosure, as discussed herein. In particular, the computer programs, when executed, enable the processor 304 to perform such features. Accordingly, such computer programs represent controllers of the computer system 300.

In variations where aspects of the disclosure are implemented using software, the software may be stored in a computer program product and loaded into computer system 300 using removable storage drive 314, hard disk drive 312, or communications interface 320. The control logic (software), when executed by the processor 304, causes the processor 304 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 4:
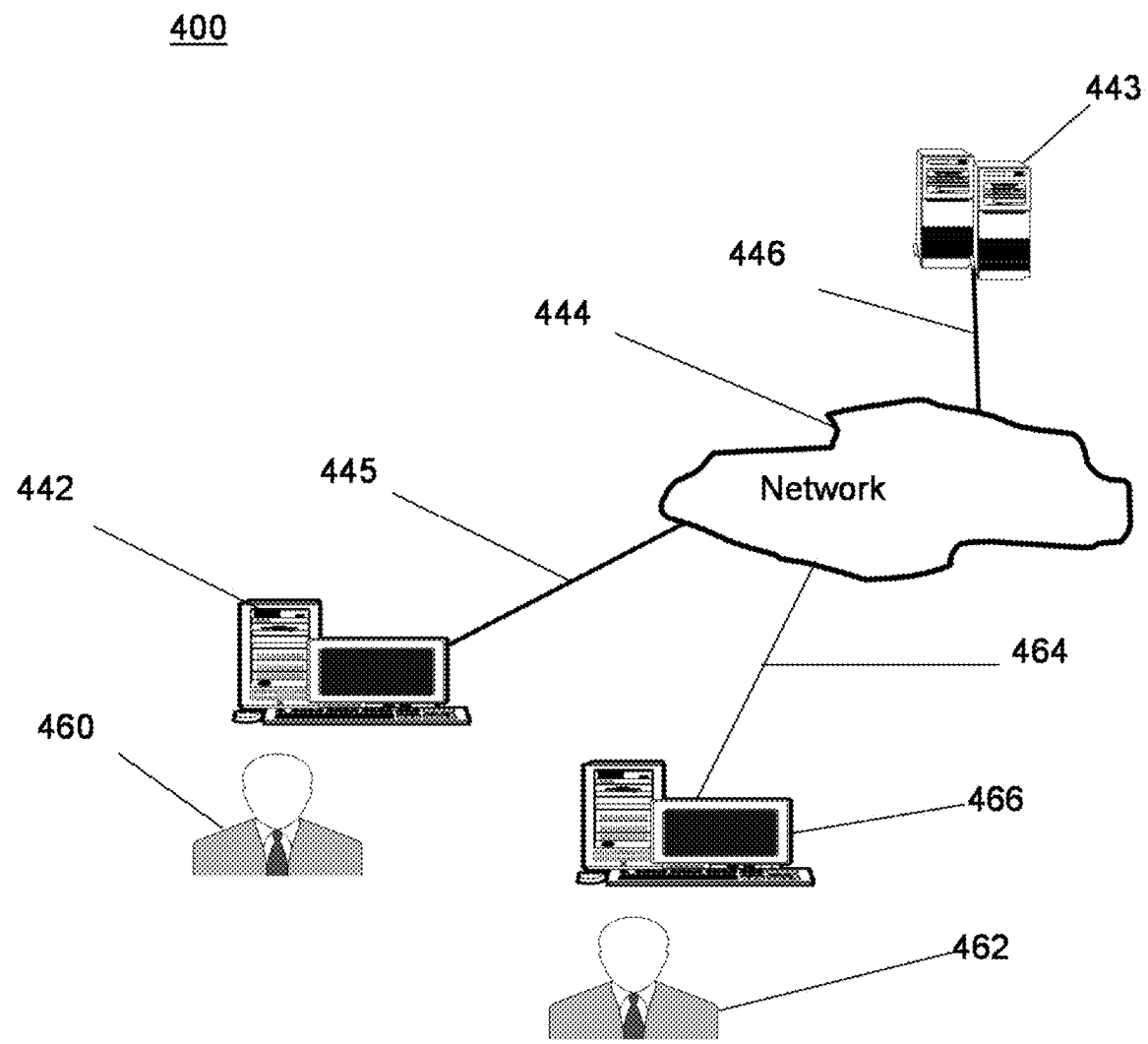
FIG. 4 is a block diagram of various exemplary system components, for use in accordance with aspects of the present disclosure.

FIG. 4 is a block diagram of various example system components that may be used in accordance with aspects of the present disclosure. For example, the various components may be within the robot 110, or only some of the components may be within the robot 110, and other components may be remote from the robot 110. The system 400 includes one or more accessors 460, 462 (also referred to interchangeably herein as one or more "users") and one or more terminals 442, 466 (such terminals may be or include, for example, various features of the robot 110, optical microphone system 120). In one aspect, data for use in accordance with aspects of the present disclosure is, for example, input and/or accessed by accessors 460, 462 via 300 terminals 442, 466, such as personal computers (PCs), minicomputers, mainframe computers, microcomputers, telephonic devices, or wireless devices, such as personal digital assistants ("PDAs") or a hand-held wireless devices coupled to a server 443, such as a PC, minicomputer, mainframe computer, microcomputer, or other device having a processor and a repository for data and/or connection to a repository for data, via, for example, a network 444, such as the Internet or an intranet, and couplings 445, 446, 464. The couplings 445, 446, 464 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system for receiving a voice signal, comprising:
an acoustic microphone;
a laser microphone;
a depth sensor;
a camera; and
a processor communicatively coupled to the acoustic microphone, laser microphone, depth sensor, camera, and a memory storing computer executable instructions, wherein the processor:
determines, a direction to a human speaker;
directs a laser beam emitted from the laser microphone at a voice box of the human speaker;
determines a distance to the human speaker using the depth sensor;
adjusts an intensity of the laser beam emitted from the laser microphone based on the distance to the human speaker determined by the depth sensor;
receives optical feedback from the laser beam striking the human speaker; and
isolates a voice signal through the optical feedback from the laser microphone from background noise in an audio signal received by the acoustic microphone.

2. The system of claim 1, wherein the processor determines the direction to the human speaker by identifying a human form in an image.

3. The system of claim 2, wherein the processor directs the laser beam at a voice box of the human speaker using facial recognition to track a face, of the human speaker in the image.

4. The system of, claim 3, wherein the processor angles the laser beam downward from the face of the human speaker based on the distance to the human speaker.

5. The system of claim 1, wherein the depth sensor determines a horizontal distance to a body of the human speaker, and the processor adjusts the horizontal distance based on an angle to the voice box of the human speaker relative to a horizontal line from the depth sensor.

6. The system of claim 1, wherein the processor:
detects movement of the optical microphone relative to the human speaker;
updates the distance to the human speaker; and
adjusts the intensity of the laser beam emitted from the laser microphone based on the distance.

7. The system of claim 1, comprising a robot on which the acoustic microphone, laser microphone, depth sensor, and camera are mounted.

8. The system of claim 7, wherein the robot comprises means for locomotion and the processor controls the robot to move relative to the human speaker.

9. The system of claim 7, wherein the robot comprises means for rotation, wherein the processor controls the means for rotation to direct the laser beam at the voice box of the human speaker.

10. The system of claim 7, wherein the processor interprets the voice signal as a voice command and controls the robot to, execute the voice command.

11. A method of receiving a voice signal comprising:
determining a direction to a human speaker;
directing a laser beam emitted from a laser microphone at a voice box of the human speaker;
determining, by a processor, a distance to the human speaker using a depth sensor;
adjusting an intensity of the laser beam emitted from the laser microphone based on the distance determined by the depth sensor;
receiving optical feedback from the laser beam striking the human speaker; and
isolating a voice signal through the optical feedback from the laser microphone from background noise in an audio signal received by an acoustic microphone.

12. The method of claim 11, wherein determining the direction to the human speaker comprises identifying a human form in an image.

13. The method of claim 12, wherein directing the laser beam at a voice box of the human speaker comprises tracking a face of the human in the image.

14. The method of claim 13, wherein directing the laser beam at the voice box of the human speaker comprises angling the laser beam downward from the face of the human speaker based on the distance to the human speaker.

15. The method of claim 11, wherein determining the distance to the human speaker using a depth sensor comprises:
determining a horizontal distance to a body of the human speaker using the depth sensor; and adjusting the horizontal distance based on an angle, to the voice box of the human speaker relative to a horizontal line from the depth sensor.

16. The method of claim 11, comprising:
moving relative to the human speaker;
updating the distance to the human speaker; and
adjusting the intensity of the laser beam emitted from the laser microphone based on the distance.

17. The method of claim 16, wherein moving relative to the human speaker includes moving a robot on which the laser beam is mounted.

18. The method of claim 11, further comprising interpreting a voice command from the voice signal.

19. A robot for receiving a voice signal, comprising:
an acoustic microphone;
a laser microphone;
a depth sensor;
a camera; and
a processor communicatively coupled to the acoustic microphone, laser microphone, depth sensor, camera, and a memory storing computer executable instructions, wherein the processor:
determines a direction to a human speaker;
directs a laser beam emitted from the laser microphone at a voice box of the human speaker;
determines a distance to the human speaker using the depth sensor;
adjusts an intensity of the laser beam emitted from the laser microphone based on the distance determined by the depth sensor;
receives optical feedback from the laser beam striking the human speaker; and
isolates a voice signal through the optical feedback from the laser microphone from background noise in an audio signal received by the acoustic microphone.

20. The robot of claim 19, wherein the processor controls the robot to:
move relative to the human speaker;
update the distance to the human speaker; and
adjust the intensity of the laser beam based on the distance.

* * * * *